United States Patent [19]

Kubota et al.

[11] Patent Number: 4,632,866
[45] Date of Patent: Dec. 30, 1986

[54] MAGNETIC RECORDING MEDIUM

[75] Inventors: Yuichi Kubota, Komoro; Akio Watanabe, Sendai, both of Japan

[73] Assignee: TDK Corporation, Tokyo, Japan

[21] Appl. No.: 716,145

[22] Filed: Mar. 26, 1985

[30] Foreign Application Priority Data

Apr. 5, 1984 [JP] Japan ................................. 59-68169
Apr. 6, 1984 [JP] Japan ................................. 59-68529

[51] Int. Cl.$^4$ .............................................. G11B 5/70
[52] U.S. Cl. .................................... 428/328; 360/134; 360/135; 360/136; 252/62.51; 252/62.56; 427/128; 427/131; 428/323; 428/403; 428/407; 428/408; 428/329; 428/694; 428/900
[58] Field of Search ............... 428/694, 900, 425.9, 428/328, 329, 323, 408, 403, 407; 427/128, 131; 252/62.56, 62.51

[56] References Cited

U.S. PATENT DOCUMENTS

| 2,535,042 | 12/1950 | Cohn | 252/62.56 |
| 3,572,993 | 3/1971 | Rogers | 252/62.56 |
| 4,137,361 | 1/1979 | Deffeyes | 428/900 |
| 4,218,507 | 8/1980 | Deffeyes | 428/900 |
| 4,347,165 | 8/1982 | Matheson | 428/335 |
| 4,554,217 | 11/1985 | Grimm | 428/695 |

*Primary Examiner*—Ellis P. Robinson
*Attorney, Agent, or Firm*—Oblon, Fisher, Spivak, McClelland, & Maier

[57] ABSTRACT

In a coating type magnetic recording medium, a base film is coated with a magnetic paint composition comprising a binder and a magnetic powder mixture of magnetic metal particles with magnetic metal carbide particles or magnetic metal particles having a metal carbide coating on the surface thereof. Preferably, the metal is iron and the metal carbide is iron carbide.

5 Claims, No Drawings

MAGNETIC RECORDING MEDIUM

BACKGROUND OF THE INVENTION

This invention relates to coated type magentic recording media, and more particularly, to an improved magnetic powder composition with which such magnetic recording media are coated.

In prior art magnetic recording media, needle-like iron oxide has been generally used as powder magnetic material.

In these years, a variety of magnetic articles of manufacture have been commercially utilized including high performance audio cassette tape, video tape, computer tape, multi-coated tape, magnetic discs, floppy discs, magnetic cards, and the like as symbolically represented by the commercial success of home VTR units. All these new applications favor magnetic recording media having higher signal recording density. The use of conventional needle iron oxide cannot fully accommodate such high density magnetic recording. Active works have been addressed to the development of new magnetic materials having higher coercive force and higher magnetic flux density.

One class of these magnetic powder materials includes magnetic metal particulates. The particulate magnetic metals have been commercially utilized in high performance audio cassette tape, video tape, and various magnetic discs. However, these particulate magnetic metals have some problems to be overcome. One problem is the low wear resistance of magnetic metal. It is significantly deteriorated during service operation. Another problem is that magnetic metal is readily oxidized. Magnetic recording media having such a magnetic metal undergo a substantial reduction in magnetic flux density due to oxidation, resulting in an output loss.

When a magnetic recording medium having such a magnetic metal is operated across a magnetic head of Sendust or amorphous metal material, there often occurs so-called "seizing". That is, a lusterless discolored layer is formed on the head surface, the layer being of different color from the head material. It is believed that the seizing is a chemical and physical quality change of Sendust or amorphous metal material on the surface due to the sliding contact between the magnetic recording medium and the magnetic head.

It is believed effective in preventing the "seizing" phenomenon that the magnetic recording medium be abrasive to such an extent that the magnetic recording medium may successively wear out the magnetic head as it passes across the head.

One of well-known methods for imparting abrasive action to magnetic recording media is by adding abrasives, for example, finely divided $Cr_2O_3$ and $Al_2O_3$ to magnetic recording media.

Our experience indicates that more than about 3% by weight of abrasive must be added to magnetic powder in order to prevent the seizing. If non-magnetic abrasive is added in an amount as large as 10% by weight or more in the magnetic recording medium, then the resulting magnetic recording medium is reduced in saturation magnetic flux density, detracting from electromagnetic characteristics.

Another problem is associated with a process of forming a magnetic recording medium using magnetic metal particles. It is imperative that an oxide coating is formed on the surface of magnetic metal particles during handling. As the case may be, an oxide coating is intensionally formed.

Magnetic recording media using magnetic metal particles having an oxide coating formed on the surface thereof have the advantages that they do not undergo a reduction in magnetic flux density due to the influence of external environments, for example, temperature and humidity or a deterioration in properties due to rust formation in the magnetic layer. However, since the surface oxide coating provides an increased electrical resistance, the magnetic recording medium tends to be electrically charged at the surface so that foreign matter will adhere to the surface, causing dropouts. Further, electric charges upon exfoliating cause discharge noises. All these factors detract from tape performance.

SUMMARY OF THE INVENTION

It is, therefore, an object of the present invention to provide an improved magnetic recording medium which is sufficiently wear resistant so as not to be deteriorated during service, oxidation resistant, free of seizing, and anti-static.

According to the present invention, there is provided a magnetic recording medium comprising a substrate coated with a magnetic paint composition having magnetic powder dispersed in a binder, the improvement wherein the magnetic powder is a mixture of magnetic metal particles and additional magnetic particles comprising a metal carbide.

In one preferred embodiment, the magnetic powder is a mixture of magnetic metal particles and magnetic metal carbide particles, and most preferably, a mixture of magnetic iron particles and magnetic iron carbide particles.

In another preferred embodiment, the magnetic powder is a mixture of magnetic metal particles and magnetic metal particles having a metal carbide coating on the surface thereof.

For simplicity of description, the magnetic metal particles having a metal carbide coating or layer on the surface is referred to as carbide-coated metal particles, hereinafter.

DETAILED DESCRIPTION OF THE INVENTION

The present invention will be illustrated in further detail.

The magnetic metal particles which can be used in the practice of the present invention are obtained by (1) starting with iron oxyhydroxide such as α-FeOOH (Goethite), β-FeOOH (Akaganite), γ-FeOOH (Lepidocrocite), etc.; iron oxides such as α-Fe$_2$O$_3$, γ-Fe$_2$O$_3$, Fe$_3$O$_4$, γ-Fe$_2$O$_3$-Fe$_3$O$_4$ (solid solution), etc.; or those iron oxyhydroxides or iron oxides doped with at least one element selected from Co, Mn, Ni, Ti, Bi, Ag, B, etc. and having an aluminum or silicon compound adsorbed and adhered to the surface; and heating the material in a reducing gas stream for reduction; thereby producing a magnetic powder consisting of iron or comprising predominantly iron; (2) a liquidus reduction method in which a metal salt in water is reduced with NaBH$_4$, or (3) an evaporation method in which a metal is evaporated in an inert gas atmosphere under vacuum.

The magnetic metal particles may be comprised of Fe, Co, and Ni alone or alloys thereof or these elemental metals and alloys in admixture with a metal such as Cr, Mn, Co and Ni, and in some cases, with a metal such as Zn, Cu, Zr, Al, Ti, Bi, Ag, Pt, etc. The addition of a minor amount of a non-metallic element such as B, C, Si, P, N, etc. to these metals does not adversely affect the present invention.

Also included are partially nitrided magnetic metal particles, for example, Fe$_4$N.

Furthermore, the magnetic metal particles may have an oxide coating on the surface thereof. The magnetic recording medium containing magnetic metal particles having an oxide coating does not undergo a reduction in magnetic flux density due to external environments including temperature and humidity or a reduction in properties due to rust formation in the magnetic layer, but have the disadvantage that the electrical resistance of the magnetic layer is increased and charging during operation often causes troubles as previously mentioned. By mixing the magnetic metal particles having an oxide coating with metal carbide particles according to the present invention, the overall electrical resistance is sufficiently reduced to prevent charging.

The magnetic metal particles used may take either needle or spherical form and a choice may be made in accordance with the intended application of magnetic recording media. When it is intended to prepare a magnetic tape of the video tape specification, needle magnetic metal particles are preferably employed, and particularly, those having a major axis of about 0.3 to 0.1 $\mu$m and a minor axis of about 0.04 to 0.01 $\mu$m.

The metal carbide particles which can be used in the practice of the present invention may be carbides of any metals belonging to the same class as the magnetic metal particles. The preferred metal carbide particles are iron carbide particles.

The iron carbide particles may be obtained by mixing an iron cyanide with a sulfate, sulfite or sulfide, admitting the mixture into an iron reactor, and heating the mixture for reduction while introducing CO, followed by cooling. There is obtained finely divided iron carbide.

The iron carbide particles may also be obtained by admitting hydrated iron oxide or needle iron oxide into an aqueous suspension of colloidal carbon black and heating the slurry mixture at 600° C. for about 10 hours while effecting hydrogen reduction.

Examples of the iron cyanides which can be used in the above-described method include hexacyanoferrates such as Turnbull's blue, Berlin white, etc.; and ferrocyanides and ferricyanides such as yellow prussiate of potash, yellow prussiate of soda, red prussiate of potash, red prussiate of soda, etc. The additives may be sulfates such as potassium sulfate, sodium sulfate, ammonium sulfate, iron sulfate, sodium hydrogen sulfate, potassium hydrogen sulfate; sulfites such as potassium sulfite, sodium sulfite, ammonium sulfite, potassium hydrogen sulfite, etc; and sulfides such as sodium thiosulfate, potassium thiosulfate, sodium sulfide, potassium sulfide, iron sulfide, sodium rhodanide, potassium rhodanide, sodium isothiocyanate, potassium isothiocyanate, etc.

The gas which is used for heat reduction in a reducing atmosphere is not limited to carbon monoxide (CO) and any reducing cabon-bearing gases such as methane (CH$_4$), water gas, and propane may be used.

Alternatively, pure iron particles may be formed followed by a variety of heat reducing treatments.

In either case, the reduction may be carried out at a heating temperature of from about 300° to 700° C. for a heating time of about ½ to about 10 hours.

The thus formed particulate iron carbide has the general formula Fe$_n$C where n is at least 2, preferably 2 or 3. Although it is not necessary that n is an integer and the material has a stoichiochemical formulation, there are often formed Fe$_2$C, Fe$_5$C$_2$, and Fe$_3$C.

There may occur a somewhat graded concentration in particles as long as C is present throughout the particle and so-called bulk particles of iron carbide are formed.

The iron carbide particles used may take either needle or spherical form and a choice may be made in accordance with the intended application of the magnetic recording medium. When it is intended to prepare a magnetic tape of the video tape specification, needle iron carbide particles are preferably employed, particularly those particles having a major axis of about 0.3 to 0.1 $\mu$m and minor axis of about 0.04 to 0.01 $\mu$m.

A substantial improvement in oxidation resistance is obtained when the weight ratio of the magnetic metal carbide particles to magnetic metal particles exceeds 3/97, particularly 10/90. These ratios are also effective in preventing seizing. Mixing of magnetic metal carbide particles has little influence on other magnetic properties.

When the weight ratio of magnetic metal carbide particles to magnetic metal particles exceeds 80/20, the resulting magnetic recording medium becomes too abrasive so that the magnetic head is roughened at its surface and substantially worn out. The lifetime of the head is then reduced. In addition, the residual magnetic flux density and coercive force characteristic of the magnetic metal particle bearing media are reduced, resulting in deteriorated electromagnetic characteristics.

For this reason, the magnetic metal particles are mixed with the magnetic metal carbide particles in a weight ratio between 97:3 and 20:80.

The foregoing discussion about the magnetic carbide particles equally applies to the magnetic carbide-coated metal particles. The only difference between the metal carbide particles and the carbide-coated metal particles is that carbon or carbide is present throughout the bulk of each particle in the former whereas each particle has a surface coating or layer of metal carbide and a core of metal in the latter.

The carbide-coated metal particles may be formed by a process similar to that described in connection with the metal carbide particles except that a careful control should be done such that carbonization is limited to only a surface layer of metal particles.

The preferred carbide-coated metal particles are metal particles having an iron carbide coating, and most preferably iron particles having an iron carbide coating. The carbide-coated metal particles, which preferably have a major axis of about 0.3 to 0.1 $\mu$m and a minor axis of about 0.04 to 0.01 $\mu$m as defined above, have a metal carbide coating of about 50 to 100 Å.

A magnetic paint composition is prepared from magnetic powder using a binder which may be thermoplastic, thermosetting, and preferably, electron radiation-curable. The magnetic powder and the binder may be mixed in a weight ratio between 6:1 and 3:1. Independent of its type, the binder may advantageously be used in combination with anti-static agents, lubricants, dispersants, coating strength reinforcing agents, and other well-known additives so as to meet the requirements of the intended use.

The magnetic layer may have a thickness from about 0.5 μm to about 5.0 μm.

The substrate may be any conventional base films used in magnetic recording media, for example, polyesters such as polyethylene terephthalate, polyamides, polyimides, polysulfones, and the like. The substrate preferably ranges from 5 μm to 20 μm thick although the substrate thickness is not particularly limited in the practice of the present invention.

The use of magnetic iron carbide particles in combination with magnetic metal particles has a number of benefits. Since the magnetic iron carbide particles are harder than the magnetic metal particles, the magnetic recording medium comprising magnetic metal particles in admixture with magnetic iron carbide particles according to the present invention are wear resistant and little degraded for an extended period of operation.

In addition, the magnetic iron carbide particles are chemically stable and resistant to oxidation, and thus very effective in preventing a reduction in magnetic flux density due to the influence of external environments including temperature and humidity and a deterioration of properties due to formation of rust.

The hardness of magnetic iron carbide particles permits the magnetic head to be successively abraded away as the magnetic recording medium passes across the head. Such continuous abrasion of the head prevents seizing and surface roughening as well as output reduction with a lapse of time.

Further, since the magnetic carbide particles are electroconductive, the surface of the associated magnetic recording medium, for example, tape is prevented from being electrically charged, which prevents the adhesion of foreign matter to the tape surface and the occurrence of discharge noise and dropouts, thus improving tape performance.

The foregoing description of the benefits resulting from the use of metal carbide particles equally applies to the carbide-coated metal particles.

The carbide-coated metal particles have lower hardness than the metal carbide bulk particles and are thus next to the metal carbide particles in the seizing preventing effect due to abrasion. However, since the carbide-coated metal particles are semi-metal particles as a whole, they have good magnetic properties including saturation magnetic flux density Bm and residual magnetic flux density Br and are chemically stable due to the presence of the carbide surface layer which is effective in preventing magnetic flux density reduction caused by external environmental conditions, for example, temperature and humidity during operation and deterioration of magnetic properties due to the formation of rust in the magnetic layer. As compared with magnetic particles having an oxide surface layer, the carbide coating has a sufficiently low electric resistance to prevent electric charging and hence, charge-induced blocking, providing improved travel performance, and to prevent adhesion of foreign matter and hence, occurrence of dropouts, introducing less noise into the circuitry.

Examples of the present invention are presented below by way of illustration and not by way of limitation.

EXAMPLES 1-8

Magnetic paint compositions were prepared from the following ingredients

| Ingredients | Parts by weight |
| --- | --- |
| Magnetic powder (see Table 1) | 100 |
| Vinyl chloride-vinyl acetate copolymer | 15 |
| Polyurethane resin | 10 |
| Surface-active agent | 1 |
| Methylethylketone | 150 |
| Methylisobutylketone | 150 |
| Lubricant | 3 |

The magnetic powders used herein are mixtures of needle Fe particles and needle $Fe_nC$ particles in varying weight ratios as shown in Table 1.

TABLE 1

| | Examples | | | | | | | |
| --- | --- | --- | --- | --- | --- | --- | --- | --- |
| | 1 | 2 | 3 | 4 | 5 | 6 | 7 | 8 |
| Needle Fe | 97 | 95 | 90 | 80 | 70 | 60 | 40 | 20 |
| Needle $Fe_nC$ | 3 | 5 | 10 | 20 | 30 | 40 | 60 | 80 |

The needle Fe particles were prepared by reducing needle α-FeOOH with hydrogen, having an average particle length of 0.2 μm, an aspect ratio of 8, a coercive force Hc of 1450 Oe, and a saturation magnetization $\sigma s$ of 155 emu/g.

The needle $Fe_nC$ particles were prepared by mixing 90 parts by weight of needle α-FeOOH with a suspension of 10 parts by weight of carbon black having a mean particle size of 30 mμ in water to form a slurry mixture, drying the mixture, grinding the dry mixture, and heating the ground mixture in an electric furnace in an atmosphere of a 1:1 mixture of CO and $H_2$ at 600° C. for 5 hours. The product was observed by X-ray diffraction analysis to be a mixed crystal of $Fe_3C$ and Fe.

Each of the compositions was milled in a ball mill for 24 hours, applied to a polyester base film, dried, and finished to a mirror surface. A standard magnetic tape was formed by cutting the film to the video tape dimensions. The thus obtained magnetic tape was measured for magnetic properties, oxidation resistance, head seizing, head surface roughening, head abrasion, and electric conductivity (or resistivity).

The results are shown in Table 3.

The percentage increase of dropouts of the tape after 200 passes of operation was determined by loading a commercial video deck with the tape, operating the tape in the deck over 200 passes, and measuring the number of dropouts per minute both at the initial and after 200 passes.

The magnetic properties including coercive force Hc and saturation magnetic flux density Bm were measured by means of a vibration-type fluxmeter.

The oxidation resistance was determined by measuring the residual magnetic flux density Br of the magnetic tape before and after the tape was aged for 7 days at a relative humidity of 98% and a temperature of 60° C. and computing the percentage reduction of residual magnetic flux density ΔBr.

The head seizing and head surface roughening were determined by moving the magnetic tape across an amorphous magnetic head in a commercial VHS video deck at a relative speed of 5.8 m/sec. for 20 hours in a laboratory, and observing the head under a microscope for discoloration and surface roughness. The head was evaluated according to the following criterion.

Head seizing

O: no discoloration

Δ: partially discolored
X: totally discolored

Head surface roughening

O: no roughening
Δ: somewhat roughened
X: severely roughened

A reduction in the output (as measured in dB) of the head at 4 MHz due to head seizing was also shown in Table 3.

The head abrasion was determined by moving the magnetic tape across an amorphous magnetic head in a commercial VHS video deck at a raltive speed of 5.8 m/sec. for 200 hours in a laboratory, and measuring a thickness loss of the head due to abrasion.

EXAMPLE 9

A magnetic tape sample was prepared using a mixture of iron particles and iron carbide particles and an electron radiation-curable binder.

First the following composition was prepared.

| | |
|---|---|
| Needle Fe powder | 8% by weight |
| Needle FeC powder | 2% by weight |
| Solvent (50/50 MEK*/toluene) | 90% by weight |

*MEK: methylethylketone

The magnetic powders used were the same as used in Example 1. The ingredients were mixed in a ball mill for 3 hours.

A binder composition was prepared by thoroughly mixing the following ingredients into a solution.

| Ingredient | % by weight |
|---|---|
| Acrylic double bond introduced saturated polyester resin (on solids basis) | 6 |
| Acrylic double bond introduced vinyl chloride/vinyl acetate copolymer (on solids basis) | 3 |
| Acrylic double bond introduced polyether urethane elastomer (on solids basis) | 3 |
| Solvent (50/50 MEK/toluene) | 87 |
| Lubricant (higher fatty acid-modified silicone oil) | 1 |

The binder composition was poured into the ball mill containing the magnetic powder mixture and milled for dispersion for a further 42 hours.

The thus obtained magnetic paint was applied onto a polyester film of 15 μm thick, subjected to orientation under the action of a permanent magnet having 1600 gauss, and heated under ultraviolet lamps to evaporate off the solvent.

The magnetic paint coating was smoothened at the surface and then cured by exposing it to electron radiation in a nitrogen atomosphere by means of an electrocurtain type radiation accelerator (manufactured by ESL Company) operating at an accelerating voltage of 150 KeV, an electrode current of 20 mA, and a total dose of 10 Mrad.

COMPARATIVE EXAMPLES 1-3

Magnetic tapes were prepared by repeating the procedure of Example 1 except that the magnetic powder contained in the magnetic paint composition was changed as shown in Table 2. The tapes were measured for various properties in the same manner as in Example 1.

It should be noted that Comparative Example 3 employed $Al_2O_3$ powder which was added in order to enhance magnetic head abrasion in the prior art.

TABLE 2

| | Comparative Examples (parts by weight) | | |
|---|---|---|---|
| | 1 | 2 | 3 |
| Needle Fe powder | 100 | 10 | 100 |
| Needle FeC powder | 0 | 90 | 0 |
| $Al_2O_3$ | 0 | 0 | 10 |

TABLE 3

| | Hc (Oe) | Bm (G) | ΔBr (%) | Output reduction (dB) | Head seizing | Head roughening | Head abrasion (μm) | Resistivity (Ω/cm$^2$) | % Increase of dropouts (200 passes/initial) |
|---|---|---|---|---|---|---|---|---|---|
| Comparative Example | | | | | | | | | |
| 1 | 1390 | 4300 | −6.9 | −3.0 | X | O | 0.1 | $3 \times 10^9$ | 1000 |
| 2 | 1170 | 2830 | −1.0 | −1.5 | O | X | 9.0 | $1.1 \times 10^6$ | 25 |
| 3 | 1400 | 3700 | −8.0 | −1.5 | Δ | Δ | 0.9 | $1.2 \times 10^{10}$ | 60 |
| Example | | | | | | | | | |
| 1 | 1380 | 4250 | −6.8 | −2.7 | Δ | O | 0.7 | $2 \times 10^9$ | 100 |
| 2 | 1370 | 4230 | −5.0 | −2.3 | O | O | 1.0 | $0.9 \times 10^9$ | 80 |
| 3 | 1360 | 4150 | −3.9 | −1.7 | O | O | 1.3 | $0.9 \times 10^8$ | 45 |
| 4 | 1340 | 4010 | −3.5 | −1.3 | O | O | 1.7 | $6.5 \times 10^7$ | 35 |
| 5 | 1320 | 3860 | −3.0 | −1.4 | O | O | 2.3 | $2.4 \times 10^7$ | 30 |
| 6 | 1300 | 3710 | −2.3 | −1.6 | O | O | 2.8 | $0.9 \times 10^7$ | 20 |
| 7 | 1260 | 3420 | −2.0 | −1.8 | O | Δ | 3.5 | $3.6 \times 10^6$ | 25 |
| 8 | 1220 | 3120 | −1.5 | −1.9 | O | Δ | 5.0 | $1.1 \times 10^6$ | 15 |
| 9 | 1335 | 3980 | −3.0 | −1.2 | O | O | 1.6 | $6.2 \times 10^8$ | 30 |

EXAMPLES 11-18

Magnetic paint compositions were prepared from the following ingredients

| Ingredients | Parts by weight |
|---|---|
| Magnetic powder (see Table 4) | 100 |
| Vinyl chloride-vinyl acetate copolymer | 15 |
| Polyurethane resin | 10 |
| Surface-active agent | 1 |
| Methylethylketone | 150 |
| Methylisobutylketone | 150 |
| Lubricant | 3 |

The magnetic powders used herein are mixtures of needle Fe particles and needle Fe particles having an iron carbide coating in varying weight ratios as shown in Table 4.

TABLE 4

| | Examples | | | | | | | |
|---|---|---|---|---|---|---|---|---|
| | 11 | 12 | 13 | 14 | 15 | 16 | 17 | 18 |
| Needle Fe | 97 | 95 | 90 | 80 | 70 | 60 | 40 | 20 |
| Carbide coated needle Fe | 3 | 5 | 10 | 20 | 30 | 40 | 60 | 80 |

The needle Fe particles used were the same as used in Example 1.

The needle Fe particles having an iron carbide coating on the surface were prepared by reducing needle α-FeOOH particles with hydrogen, mixing 1 kg of the resulting needle Fe particles (having an average particle length of 0.3 μm, aspect ratio of 9, coercive force of 1550 Oe, saturated magnetization σs of 160 emu/g) with an aqueous solution of 200 g of Prussian blue, causing Prussian blue to deposit on the needle Fe particle surface, drying the mixture to remove water, finely dividing the dry mixture, and heating the ground mixture in an atmosphere of a 1/1 gas mixture of CO and $H_2$ in an electric furnace at 600° C. for one hour. The resulting product was observed by micro-range X-ray diffractometry to be a mixture of $Fe_3C$ and Fe. The particles having a surface coating of iron carbide were examined by XPS for distribution of Fe and C ions in the depth direction. It was found that Fe ions increase and C ions decrease with a progress of etching from the surface. These analyses lead to the conclusion that the resultant powder is a mass of needle Fe particles having a surface layer of $Fe_3C$.

The needle Fe particles having an $Fe_3C$ surface layer were not changed in shape from the initial needle Fe particles and had a coercive force Hc of 1330 Oe and a saturation magnetization σs of 135 emu/g. The iron carbide surface layer had a thickness of about 0.01 μm.

Each of the compositions was milled in a ball mill for 24 hours, applied to a polyester base film, dried, and finished to a mirror surface. A standard magnetic tape was formed by cutting the film to the video tape dimensions. The thus obtained magnetic tape was measured for magnetic properties, oxidation resistance, head seizing, head surface roughening, head abrasion, and electric conductivity (or resistivity). The percentage increase of dropouts of the tape after 200 passes of operation was also determined. The procedures of these measurements are the same as described in Example 1.

The results are shown in Table 6.

EXAMPLE 19

A magnetic tape sample was prepared using a mixture of Fe particles and iron carbide-coated Fe particles and an electron radiation-curable binder.

| First the following composition was prepared. | |
|---|---|
| Needle Fe powder | 8% by weight |
| Iron carbide coated needle Fe powder | 2% by weight |
| Solvent (50/50 MEK/toluene) | 90% by weight |

The magnetic powders used were the same as used in Example 11. The ingredients were mixed in a ball mill for 3 hours.

A binder composition was prepared by thoroughly mixing the following ingredients into a solution.

| Ingredient | % by weight |
|---|---|
| Acrylic double bond introduced saturated polyester resin (on solids basis) | 6 |
| Acrylic double bond introduced vinyl chloride/vinyl acetate copolymer (on solids basis) | 3 |
| Acrylic double bond introduced polyether urethane elastomer (on solids basis) | 3 |
| Solvent (50/50 MEK/toluene) | 87 |
| Lubricant (higher fatty acid-modified silicone oil) | 1 |

The binder composition was poured into the ball mill containing the magnetic powder mixture and milled for dispersion for a further 42 hours.

The thus obtained magnetic paint was applied onto a polyester film of 15 μm thick, subjected to orientation under the action of a permanent magnet having 1600 gauss, and heated under ultraviolet lamps to evaporate off the solvent.

The magnetic paint coating was smoothened at the surface and then cured by exposing it to electron radiation in a nitrogen atomosphere by means of an electro-curtain type radiation accelerator (manufactured by ESL Company) operating at an accelerating voltage of 150 KeV, an electrode current of 20 mA, and a total dose of 10 Mrad.

COMPARATIVE EXAMPLES 11-13

Magnetic tapes were prepared by repeating the procedure of Example 11 except that the magnetic powder contained in the magnetic paint composition was changed as shown in Table 5. The tapes were measured for various properties in the same manner as in Example 1.

It should be noted that Comparative Example 13 employed $Al_2O_3$ powder which was added in order to enhance magnetic head abrasion in the prior art.

TABLE 5

| | Comparative Examples (parts by weight) | | |
|---|---|---|---|
| | 11 | 12 | 13 |
| Needle Fe powder | 100 | 10 | 100 |
| Iron carbide coated needle Fe powder | 0 | 90 | 0 |
| $Al_2O_3$ | 0 | 0 | 10 |

TABLE 6

| | Hc (Oe) | Bm (G) | ΔBr (%) | Output reduction (dB) | Head seizing | Head roughening | Head abrasion (μm) | Resistivity (Ω/cm²) | % Increase of dropouts (200 passes/initial) |
|---|---|---|---|---|---|---|---|---|---|
| Comparative Example | | | | | | | | | |
| 11 | 1390 | 4300 | −6.9 | −3.0 | X | O | 0.1 | $3 \times 10^9$ | 1000 |
| 12 | 1240 | 3750 | −1.5 | −2.5 | O | X | 7.0 | $1.1 \times 10^7$ | 30 |
| 13 | 1400 | 3700 | −8.0 | −1.5 | Δ | Δ | 0.9 | $1.2 \times 10^{10}$ | 60 |
| Example | | | | | | | | | |

TABLE 6-continued

| | Hc (Oe) | Bm (G) | ΔBr (%) | Output reduction (dB) | Head seizing | Head roughening | Head abrasion (μm) | Resistivity (Ω/cm$^2$) | % Increase of dropouts (200 passes/initial) |
|---|---|---|---|---|---|---|---|---|---|
| 11 | 1380 | 4250 | −6.7 | −2.7 | Δ | O | 0.6 | $2 \times 10^9$ | 100 |
| 12 | 1370 | 4260 | −5.2 | −2.2 | O | O | 0.9 | $1.3 \times 10^9$ | 80 |
| 13 | 1370 | 4230 | −4.0 | −1.7 | O | O | 1.1 | $0.9 \times 10^9$ | 50 |
| 14 | 1350 | 4170 | −3.7 | −1.2 | O | O | 1.5 | $5.5 \times 10^8$ | 30 |
| 15 | 1330 | 4100 | −3.2 | −1.5 | O | O | 2.1 | $2.0 \times 10^8$ | 30 |
| 16 | 1340 | 4050 | −2.5 | −1.6 | O | O | 2.4 | $0.8 \times 10^8$ | 20 |
| 17 | 1290 | 3940 | −2.1 | −1.9 | O | O | 3.1 | $3.6 \times 10^7$ | 20 |
| 18 | 1280 | 3850 | −1.9 | −2.1 | O | Δ | 4.9 | $1.2 \times 10^7$ | 10 |
| 19 | 1355 | 4150 | −3.5 | −1.3 | O | O | 1.5 | $6.2 \times 10^8$ | 30 |

Tables 3 and 6 show that the addition of iron carbide particles and carbide-coated iron particles to iron particles is effective in preventing head seizing and improving the magnetic properties and performance of the magnetic recording tape.

The present invention is illustrated by referring to iron particles, iron carbide particles and iron carbide-coated iron particles in the foregoing embodiments. It will be understood that the present invention equally applies to cobalt, nickel and other magnetic metals and alloys. Modifications and changes may be made to the illustrated embodiments without departing from the scope of the present invention.

We claim:

1. In a magnetic recording medium comprising a substrate coated with a magnetic paint composition having magnetic powder dispersed in a binder, the improvement wherein the magnetic powder is a mixture of (a) magnetic metal particles and (b) magnetic iron carbide particles and/or magnetic metal particles having an iron carbide coating on the surface thereof, with the weight ratio of (a) to (b) being in the range between 97:3 and 20:80.

2. The magnetic recording medium of claim 1 wherein the iron carbide has the formula Fe$_n$C wherein n is a number of at least 2.

3. The magnetic recording medium of claim 1 or 2 wherein all the magnetic particles are of needle shape.

4. The magnetic recording medium of claim 1 wherein the magnetic powder is a mixture of (a) magnetic metal particles and (b) magnetic iron carbide particles.

5. The magnetic recording medium of claim 1 wherein the magnetic powder is a mixture of (a) magnetic metal particles and (b) magnetic metal particles having an irom carbide coating.

* * * * *